United States Patent [19]

Yazawa et al.

[11] Patent Number: 4,539,264

[45] Date of Patent: Sep. 3, 1985

[54] MAGNETIC RECORDING MEDIUM

[75] Inventors: Kenji Yazawa; Kenichi Baba, both of Yokohama, Japan

[73] Assignee: Sony Corporation, Tokyo, Japan

[21] Appl. No.: 539,654

[22] Filed: Oct. 6, 1983

[30] Foreign Application Priority Data

Oct. 12, 1982 [JP] Japan ................................ 57-178749

[51] Int. Cl.³ .............................................. G11B 5/66
[52] U.S. Cl. .................... 428/621; 360/134; 360/135; 360/136; 427/131; 427/132; 428/216; 428/336; 428/693; 428/694; 428/678; 428/900; 428/928
[58] Field of Search ................. 427/131, 132; 428/900, 428/692, 693, 694, 621, 678, 668, 928, 161, 209, 216, 336; 360/134–136

[56] References Cited

U.S. PATENT DOCUMENTS 4,254,189  3/1981  Fisher .................................. 427/132
4,307,156  12/1981  Yanagisawi ........................ 427/132
4,387,136  6/1983  Saito et al. .......................... 428/900

FOREIGN PATENT DOCUMENTS 56-34139  4/1981  Japan .................................. 428/900
56-34150  4/1981  Japan .................................. 427/129
56-03142  6/1981  Japan .................................. 427/131

OTHER PUBLICATIONS

IBM Technical Disclosure Bulletin, vol. 22, No. 7, (Dec. 1979), p. 2865.

Primary Examiner—Ellis P. Robinson
Attorney, Agent, or Firm—Hill, Van Santen, Steadman & Simpson

[57] ABSTRACT

A magnetic recording medium having a non-magnetic substrate, a bismuth layer of less than 100 Å thick formed on one major surface of the non-magnetic substrate and a magnetic metal thin film formed on the bismuth layer.

7 Claims, 4 Drawing Figures

MAGNETIC RECORDING MEDIUM

Cross reference of the present invention relates to our copending U.S. patent application, Ser. No. 367,949, filed Apr. 13, 1982 abandoned.

BACKGROUND OF THE INVENTION

1. Field of the Invention

The present invention generally relates to a magnetic recording medium and more particularly is directed to a magnetic recording medium in which a magnetic metal thin film is deposited on a non-magnetic substrate.

2. Description of the Prior Art

A conventional magnetic recording medium which is provided in such a manner that a magnetic paint composed of acicular magnetic powder and polymeric binder is coated on a non-magnetic substrate to form a magnetic recording layer thereon is generally used.

On the other hand, a magnetic metal thin film magnetic recording medium which is formed by such a manner that magnetic metal such as Co, Fe, Ni and so on or alloy of them is deposited on a non-magnetic substrate according to a so-called physical vapor deposition technique such as vacuum evaporation, sputtering or ion plating and so on is now noted. Since the magnetic recording medium of the magnetic metal thin film type needs no non-magnetic binder, it can present significantly high residual magnetic flux density. In addition, since the magnetic material layer thereof can be formed quite thin, this magnetic recording medium produces a high output and is superior in short wavelength response characteristic.

However, with mere vapor evaporation of magnetic metal such as Co or the like on the non-magnetic substrate, it is difficult to obtain a magnetic layer having high coercive force. Therefore, as a method for forming a magnetic recording layer which has high coercive force, a so-called oblique evaporation method is proposed in which vapor of magnetic metal particles is obliquely incident on a non-magnetic substrate thereby deposited. This oblique evaporation method, however, has poor vapor evaporation efficiency and productivity is low.

OBJECTS AND SUMMARY OF THE INVENTION

Accordingly, it is an object of the present invention to provide a magnetic recording medium which can obviate the above defects inherent in the conventional magnetic recording medium.

It is another object of the present invention to provide a magnetic recording medium which can present high coercive force and high rectangular ratio without employing an oblique evaporation method.

It is still another object of the present invention to provide a magnetic recording medium which can obtain superior recording sensitivity and reproduced output.

It is a further object of the present invention to provide a magnetic recording medium having an isotropic magnetic characteristics in the plane of magnetic layer.

According to one aspect of the present invention, there is provided a magnetic recording medium comprising:

a non-magnetic substrate;

a first layer made of bismuth formed on said substrate, said first layer having a thickness less than 100 Å; and a ferromagnetic metal layer formed over said first layer, said magnetic recording medium having an isotropic magnetic characteristics on a major surface of said magnetic recording medium.

The other objects, features and advantages of the present invention will become apparent from the following description taken in conjunction with the accompanying drawings through which the like references designate the same elements and parts.

DESCRIPTION OF THE PREFERRED EMBODIMENTS

Figure 1:
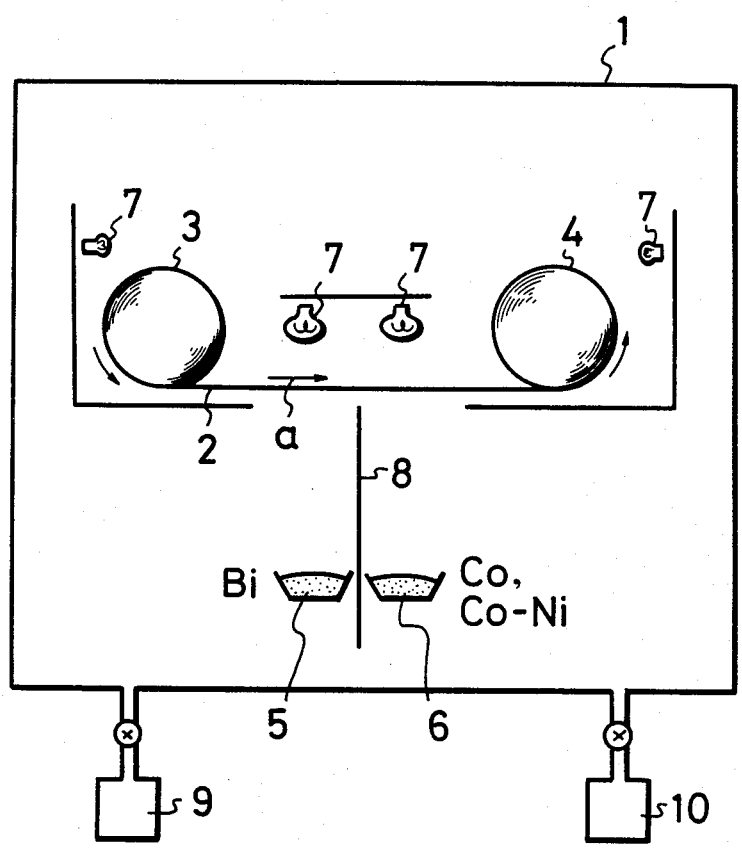
FIG. 1 is a schematic diagram of an example of the apparatus for manufacturing a magnetic recording medium according to the present invention.

Now, the present invention will hereinafter be described in detail with reference to the attached drawings.

In accordance with the present invention, a bismuth layer having a thickness of less than 100 Å is deposited on a non-magnetic substrate and a magnetic metal thin film is deposited on the bismuth layer.

A polymeric film made of such as polyethylene telephthalate, polyamide, polyamide imide, polyimide and so on, glass ceramics or metal plate the surface of which is oxidized, etc can be used as a non-magnetic substrate of the present invention. An under layer made of bismuth Bi is formed on the non-magnetic substrate. The mean film thickness thereof is selected to be less than 100 Å (less than 10 $\mu g/cm^2$) and more preferably in a range from 10 to less than 100 Å (less than 1 to 10 $\mu g/cm^2$) in which the values within the parentheses result from calculating the mean film thickness by bismuth Bi amount per 1 $cm^2$. Because, when the film thickness of the bismuth Bi under layer is selected less than 10 Å, even if a metal magnetic layer is formed on the bismuth Bi under layer, such an effect is not confirmed that the coercive force of the magnetic material layer becomes large, while when the thickness of the bismuth Bi under layer is selected larger than 100 Å, the rectangular ratio of the magnetic material layer becomes small. Namely, when the thickness of the bismuth Bi under layer is less than 100 Å, the rectangular ratio of the magnetic metal layer exceeds about 80% which is a quite excellent value. A magnetic metal layer mainly composed of Co or Co-Ni alloy is used as the magnetic metal layer formed on the bismuth Bi under layer. The thickness of the magnetic metal layer is selected to be in a range from 100 to 1000 Å and more preferably in a range from 200 to 500 Å. If the film thickness of this magnetic metal layer is less than 100 Å, magnetization is not sufficient, while if it exceeds 1000 Å, coercive force Hc and rectangular ratio Rs thereof are lowered. This magnetic metal layer can be made of only Co or Co-Ni alloy as described before. In this case, if the magnetic metal layer contains Ni of 20 to 50 atomic % and more preferably 30 to 50 atomic %, particularly the coercive force thereof can be increased. However, when the amount of Ni is beyond 50 atomic %, the coercive force thereof can be made large but the magnetic flux density thereof is lowered.

The magnetic recording medium according to the present invention is not limited to the double layer or bilayer structure of the bismuth Bi under layer and the magnetic metal layer but can be made in such a manner that a plurality of layers are superposed on the basis of the bilayer structure of the bismuth Bi under layer and the ferromagnetic metal layer. In this case, the number of the layers to be superposed may be selected appropriate enough for providing necessary magnetization. When the bismuth Bi under layer and the bilayer structure formed of the first and second magnetic metal layers are superposed as mentioned above, by interposing an amorphous continuous film made of silicon or silicon compound or compound of the first magnetic metal layer between the first magnetic metal layer and the second bismuth Bi under layer to be formed thereon (the under layer for the second magnetic metal layer), the film forming property of the bismuth Bi layer to be formed thereon can be improved. When the compound of the first magnetic metal layer is interposed therebetween, it is desired that oxide, nitride or carbide of the magnetic metal is formed by oxidizing, nitrogenizing or carbonizing the surface of the first magnetic metal layer. And, the thickness of the above compound is preferably selected in a range from 10 to 100 Å. Particularly, when the oxide of the magnetic metal layer is formed, the above oxide can be formed in such a manner that after the magnetic metal layer is formed, a small quantity of oxygen gas is introduced into the vacuum chamber under which the magnetic material layer is formed and the surface of the magnetic metal layer is oxidized in DC, AC or high frequency plasma. The thickness of this oxide layer can be controlled by selecting partial pressure of supplied oxygen gas, applied voltage, the shape of electrodes, the distance between electrodes and/or duration of time for applying the voltage and so on.

FIG. 1 schematically shows an example of the apparatus for manufacturing the magnetic recording medium of the present invention. In FIG. 1, reference numeral 1 designates a vacuum chamber within which a supply-reel 3 and a take-up reel 4 are placed and a non-magnetic substrate 2 is moved from the supply-reel 3 to the take-up reel 4 or in the arrow direction a in the figure. A bismuth Bi evaporating source 5 and a magnetic metal, for example, Co or Co-Ni alloy evaporating source 6 are respectively placed at the under side of the non-magnetic substrate 2 within the vacuum chamber 1. In the figure, reference numerals 7 designate heating lamps which control the temperature of the non-magnetic substrate 2, reference numeral 8 a shield or partition plate and reference numerals 9 and 10 vacuum pumping means, respectively. With the construction thus made, although not shown, the bismuth Bi and the magnetic metal are respectively evaporated according to the electron beam heating method, resistance heating method and so on. Then, the bismuth Bi under layer and the magnetic metal layer are sequentially deposited on the non-magnetic substrate 2. In the example of FIG. 1, the bismuth Bi under layer and the magnetic metal layer are formed on the moving non-magnetic substrate of continuous film shape but can sequentially be formed on a disc-shape substrate while being rotated. Moreover, according to the present invention, the magnetic layer having high coercive force can be formed without using the oblique evaporation method. However, even though the oblique evaporation method may be employed, the effect of the present invention is never lost. In this case, while moving the non-magnetic substrate along the outer periphery of a cylindrical rotation can, the magnetic metal layer can be formed. In addition, while moving the nonmagnetic substrate slantwise relative to the evaporated particle flow, the magnetic metal layer can be formed.

It is desired that the deposition of the bismuth Bi under layer is carried out under high vacuum atmosphere, for example, $10^{-5}$ to $10^{-7}$ Torr. The succeeding deposition of the magnetic metal may be carried out under similar high vacuum atmosphere and also under atmosphere having a small amount of oxygen. In this case, anti-ferromagnetic appears among Co-O-Co in the magnetic metal layer deposited so that higher coercive force can be obtained. If the quantity of oxygen is gradually increased from high vacuum atmosphere, high coercive force Hc can be obtained without lowering the film strength. The oxygen can be introduced up to the pressure of approximately $5 \times 10^{-3}$ Torr.

The magnetic recording medium according to the present invention will hereinafter be described with reference to the examples.

EXAMPLE 1

By the use of the vacuum evaporating apparatus shown in FIG. 1, while a non-magnetic substrate made of polyimide film was moved at the speed of 1.5 m/minute, bismuth Bi and cobalt Co were sequentially deposited on the non-magnetic substrate to be the thickness of 60 Å and 300 Å, respectively, thus forming a magnetic recording medium. The vacuum degree was selected to be approximately $10^{-5}$ Torr and the non-magnetic substrate was held at 150° C. The characteristics of the magnetic recording medium were presented such that its coercive force Hc was 620 Oe and its rectangular ratio Rs was 0.83.

COMPARATIVE EXAMPLE

In the same way as in the example 1, a bismuth Bi under layer having a thickness of 200 Å and a cobalt Co magnetic layer having a thickness of 300 Å were formed and thus a magnetic recording medium was formed. The coercive force Hc of this magnetic recording medium was 1020 Oe and the rectangular ratio Rs thereof was 0.73.

EXAMPLE 2

Figure 2:
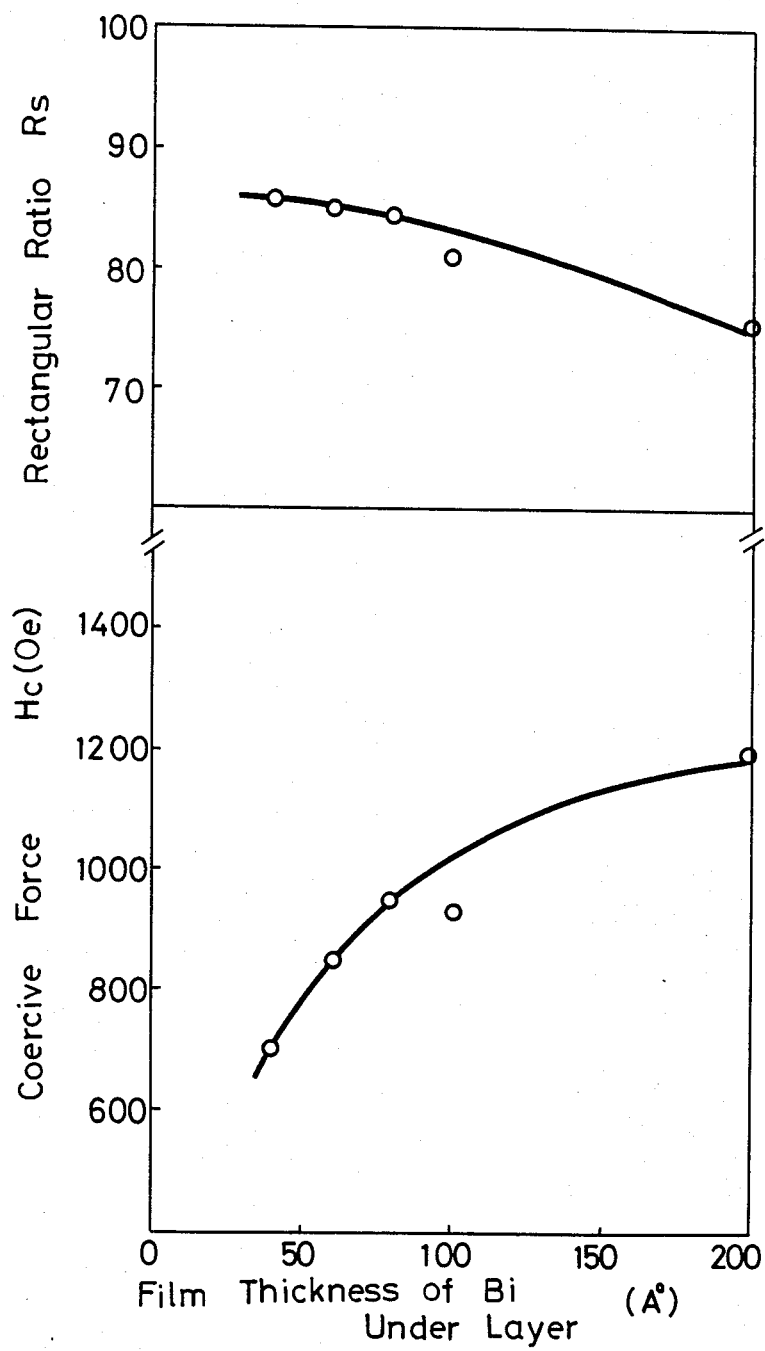
FIGS. 2 to 4 are respectively graphs showing the magnetic characteristic of the magnetic recording medium according to the present invention.

In the same way as in the example 1, a bismuth Bi under layer and an Ni-Co alloy magnetic layer containing Ni of 20 atomic % were formed and thus a magnetic recording medium was obtained. In the example 2, the coercive force Hc and the rectangular ratio Rs measured when the thickness of the bismuth Bi under layer was changed variously are shown in the graph of FIG. 2.

EXAMPLE 3

Figure 3:
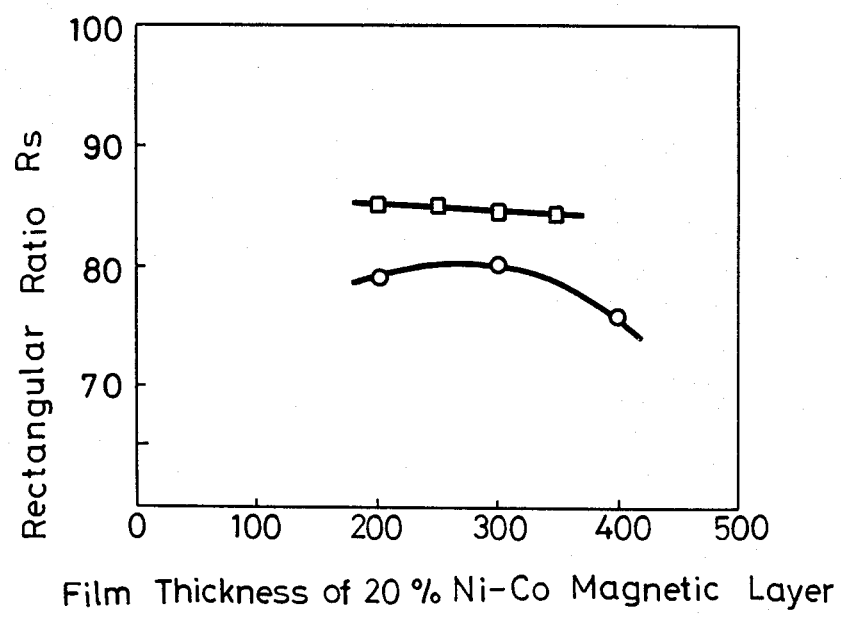

In the same way as in the example 1, a bismuth Bi under layer and an Ni-Co alloy magnetic layer containing Ni of 20 atomic % were formed and thus a magnetic recording medium was obtained. The rectangular ratio Rs measured when the thickness of the Ni-Co alloy magnetic layer was changed variously is shown in the graph of FIG. 3. In this graph, square marks indicate measured rectangular ratio Rs when the thickness of the bismuth Bi under layer is selected to be 60 Å, while circle marks indicate that when the thickness of the bismuth Bi under layer is selected to be 140 Å.

EXAMPLE 4

Figure 4:
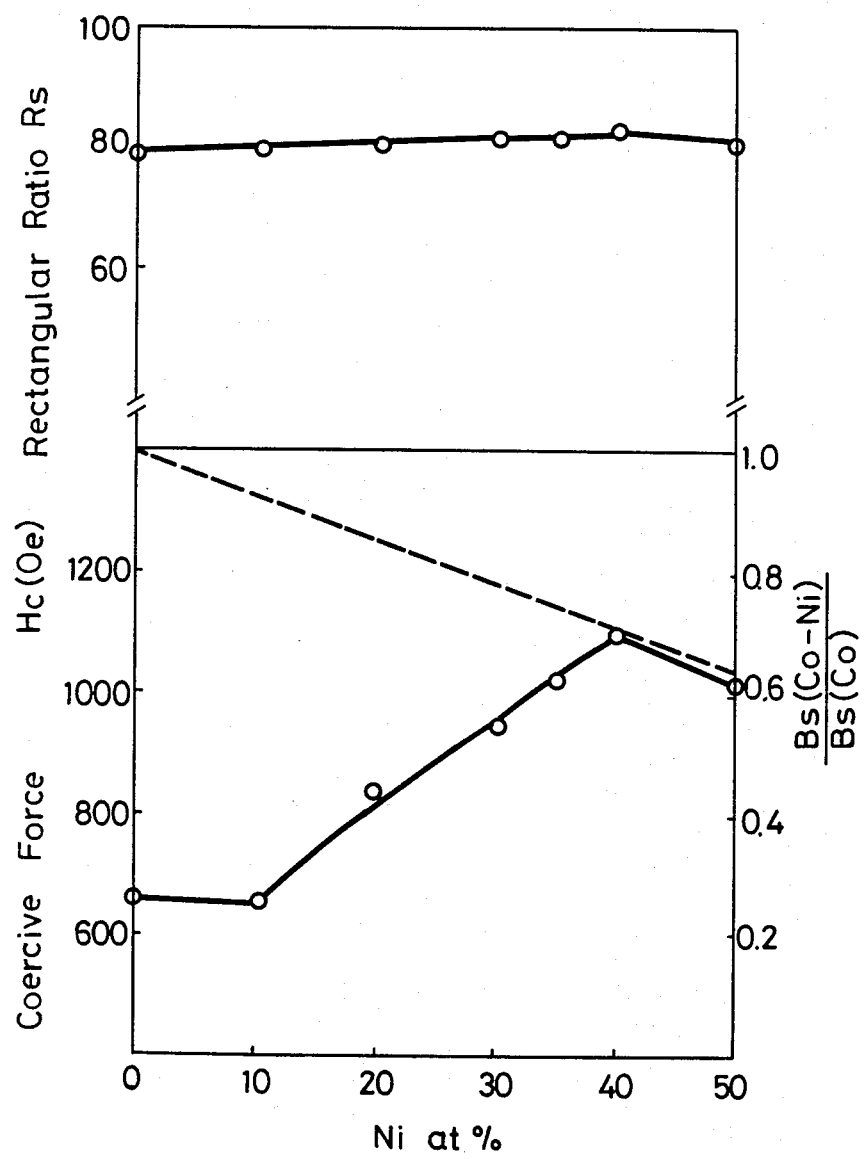

In the atmosphere of oxygen partial pressure of 0.06 to 0.07 Torr, while a polyimide film was transported between a pair of electrodes, the surface of polyimide film was subjected to O₂ ion bombardment treatment for about 1.5 minutes. At that time, voltage of 1 kV was applied across the electrodes and the current flowed between the electrodes was 80 mA. After that, in the same way as in the example 1, under the high vacuum condition a bismuth Bi under layer and an Ni-Co alloy magnetic layer were deposited on the polyimide film to the thicknesses of 80 Å and 300 Å, respectively. Thereafter, again in the atmosphere of 0.06 to 0.07 Torr, the magnetic layer was subjected to the O₂ ion bombardment treatment under the same condition as described above to form an oxide layer on the surface of the magnetic layer. A bismuth Bi layer was again deposited on the magnetic layer having on its surface the oxide layer to the thickness of 80 Å and then the Ni-Co alloy magnetic layer was deposited thereon to the thickness of 300 Å was deposited thereon. Thereafter, under the aforementioned condition, the surface of the magnetic layer was subjected to the O₂ ion bombardment treatment, thus a magnetic recording medium being obtained. Coercive force Hc and rectangular ratio Rs thereof measured when the amount of Ni contained in the Ni-Co alloy metal was changed variously are shown in the graph of FIG. 4. In FIG. 4, a broken line indicates measured saturation magnetic flux density, and the saturation magnetic flux density decreases in inverse proportion to the increase of Ni containing quantity.

EXAMPLE 5

In the same way as in the example 4, after the non-magnetic substrate made of a polyimide film was subjected to the O₂ ion bombardment treatment, the bismuth Bi under layer having the thickness of 60 Å and the Ni-Co alloy layer of 300 Å thick having Ni of 20 atomic % were deposited on the non-magnetic substrate. After that, the Ni-Co alloy layer was subjected to the O₂ ion bombardment treatment, the bismuth Bi under layer having the thickness of 60 Å and the similar Ni-Co alloy layer having the thickness of 300 Å were again deposited on the Ni-Co alloy layer, and then the surface of the Ni-Co alloy layer was again subjected to the O₂ ion bombardment treatment. Then, under the condition that the longitudinal direction of a magnetic recording medium thus made is taken as 0°, the magnetic characteristics thereof were measured along the directions of 0°, 30°, 60° and 90° on the major surface of the magnetic recording medium. The measured results are shown on the table 1.

TABLE 1

| angle | coercive force Hc | rectangular ratio Rs |
|---|---|---|
| 0° | 1050 Oe | 0.81 |
| 30° | 1050 Oe | 0.81 |
| 60° | 1050 Oe | 0 81 |
| 90° | 1045 Oe | 0.81 |

As will be clear from the above examples, since the magnetic recording medium according to the present invention has the bismuth Bi under layer having the thickness less than 100 Å deposited on the non-magnetic substrate and the magnetic metal layer deposited thereof, it presents superior magnetic characteristics such as large coercive force, rectangular ratio higher than 0.80, superior recording sensitivity and large reproduced output.

Moreover, the bismuth Bi layer having the low boiling point (1560° C.) is formed as the under layer so that when the bismuth Bi layer is deposited, heat radiation from the evaporating source on the non-magnetic substrate is relatively small. Although the succeeding magnetic metal, for example, Co (having a boiling point, 3100° C.) generates large heat radiation upon evaporation, the existence of the bismuth Bi under layer decreases the direct heat radiation on the non-magnetic substrate. Accordingly, even when a polymeric film or the like is used as the non-magnetic substrate, the heat deformation of the film can be avoided largely.

Furthermore, when the Ni-Co alloy layer containing Ni of 20 to 50 atomic %, more preferably 30 to 50 atomic % is formed as the magnetic metal layer, it is possible to obtain the magnetic recording medium having large rectangular ratio and higher coercive force.

As seen in the example 5, according to the magnetic recording medium of the present invention, the magnetic characteristics thereof are free from direction dependency within the surface thereof so that this magnetic recording medium is suitable for use as not only a magnetic recording medium of continuous film shape but also a magnetic recording medium of disc shape.

The above description is given on the preferred embodiments of the invention, but it will be apparent that many modifications and variations could be effected by one skilled in the art without departing from the spirits or scope of the novel concepts of the invention, so that the scope of the invention should be determined by the appended claims only.

I claim as my invention:

1. A magnetic recording medium comprising:
   a non-magnetic substrate;
   a first layer made of bismuth formed on said substrate, said first layer having a thickness less than 100 Å; and
   a ferromagnetic metal layer of Co or Co-Ni alloy formed over said first layer without further physical treatment of said first layer, said magnetic recording medium having isotropic magnetic characteristics on a major surface of said magnetic recording medium.

2. A magnetic recording medium according to claim 1, wherein said ferromagnetic metal layer has a thickness ranging from 100 to 1000 Å.

3. A magnetic recording medium according to claim 1, wherein said ferromagnetic metal layer is made of cobalt.

4. A magnetic recording medium according to claim 1, wherein said ferromagnetic metal layer is made of Co-Ni alloy containing Ni of 20 to 50 atomic %.

5. A magnetic recording medium according to claim 1, wherein said ferromagnetic metal layer has a ferromagnetic metal compound layer formed on its surface.

6. A magnetic recording medium according to claim 1 further comprising a bismuth layer and a ferromagnetic layer superposed on said ferromagnetic metal layer.

7. A magnetic recording medium according to claim 1, wherein said bismuth layer and ferromagnetic layer are deposited successively by vacuum evaporation.

* * * * *